June 5, 1934.  G. H. TROUT  1,961,803
CABINET
Filed Oct. 10, 1931  5 Sheets-Sheet 1

INVENTOR.
George H. Trout
BY Luther Johns
ATTORNEYS.

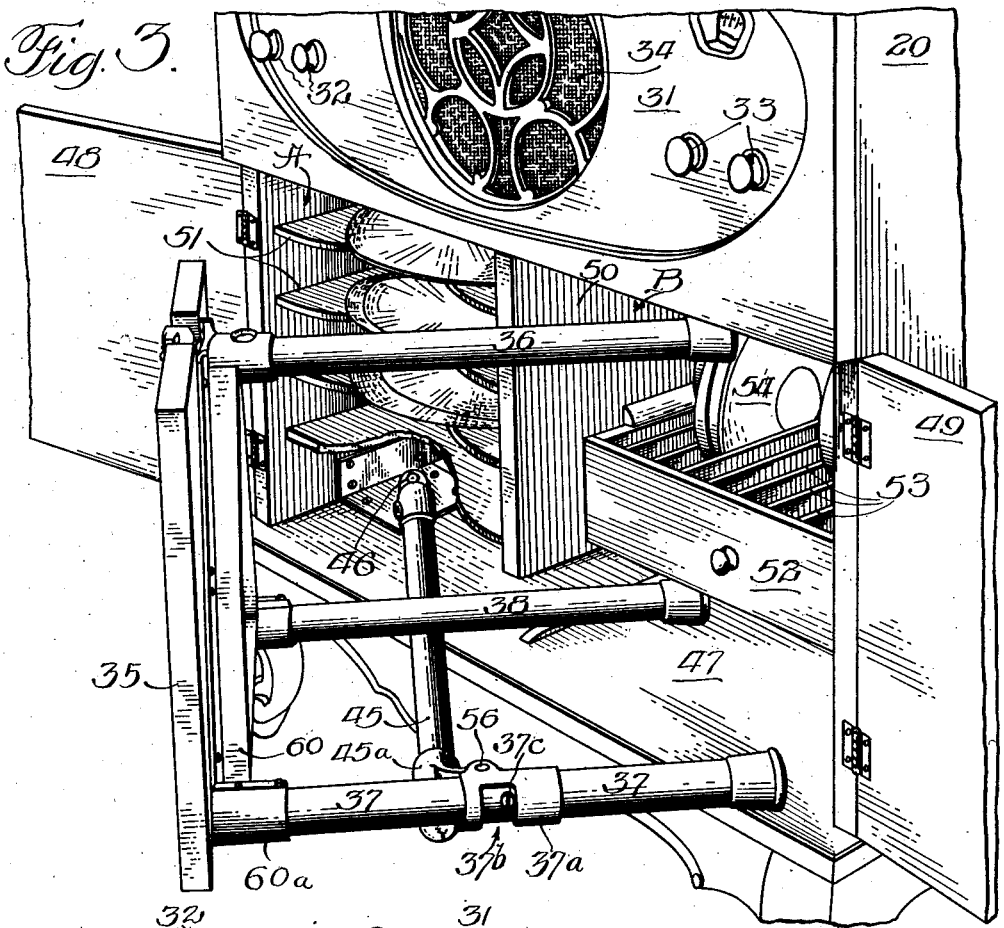
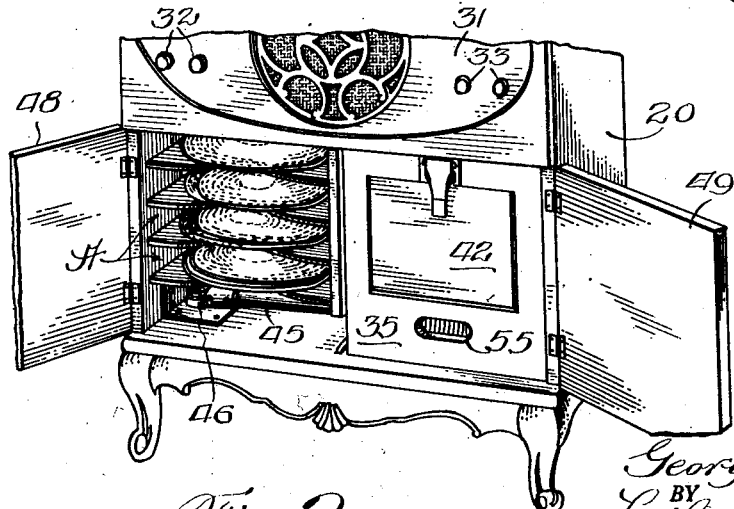

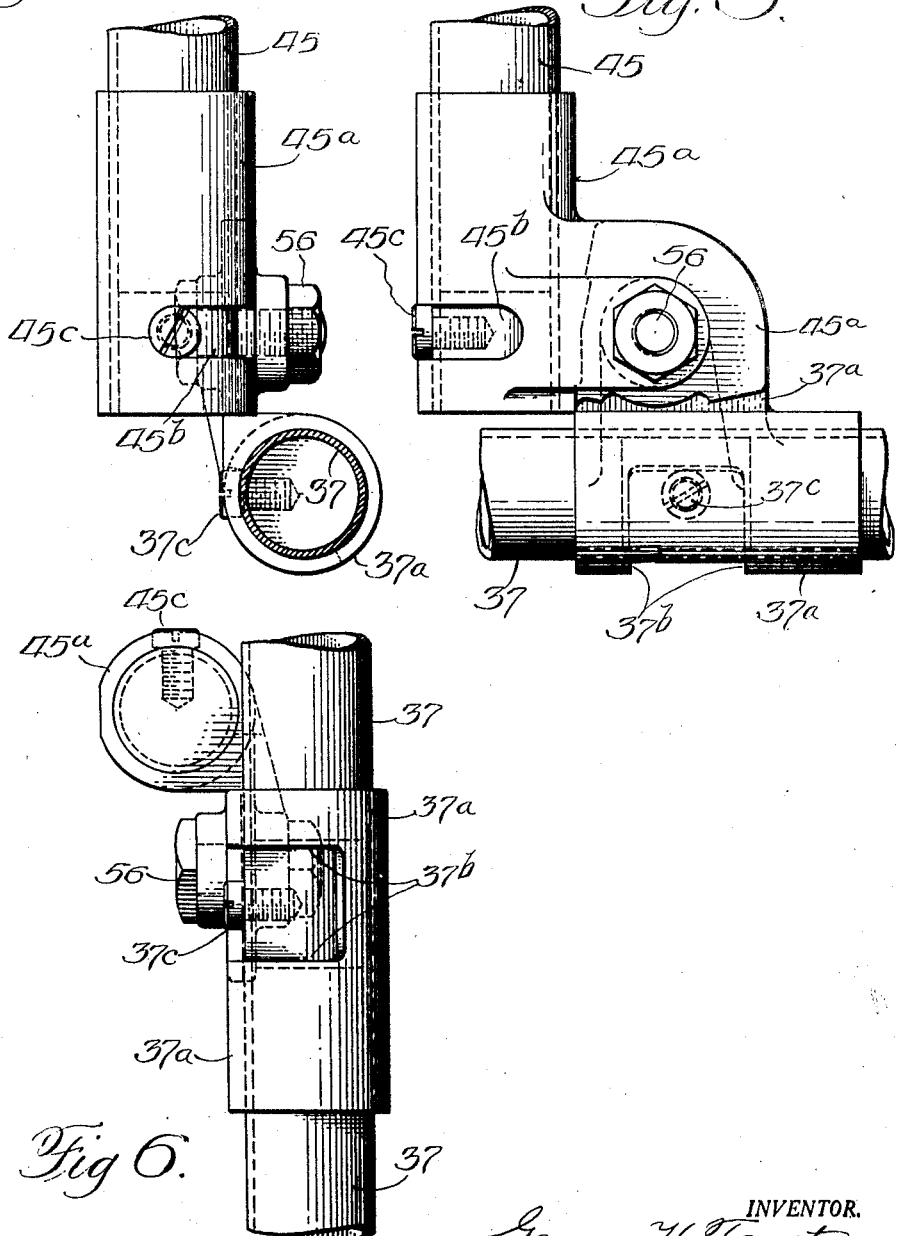

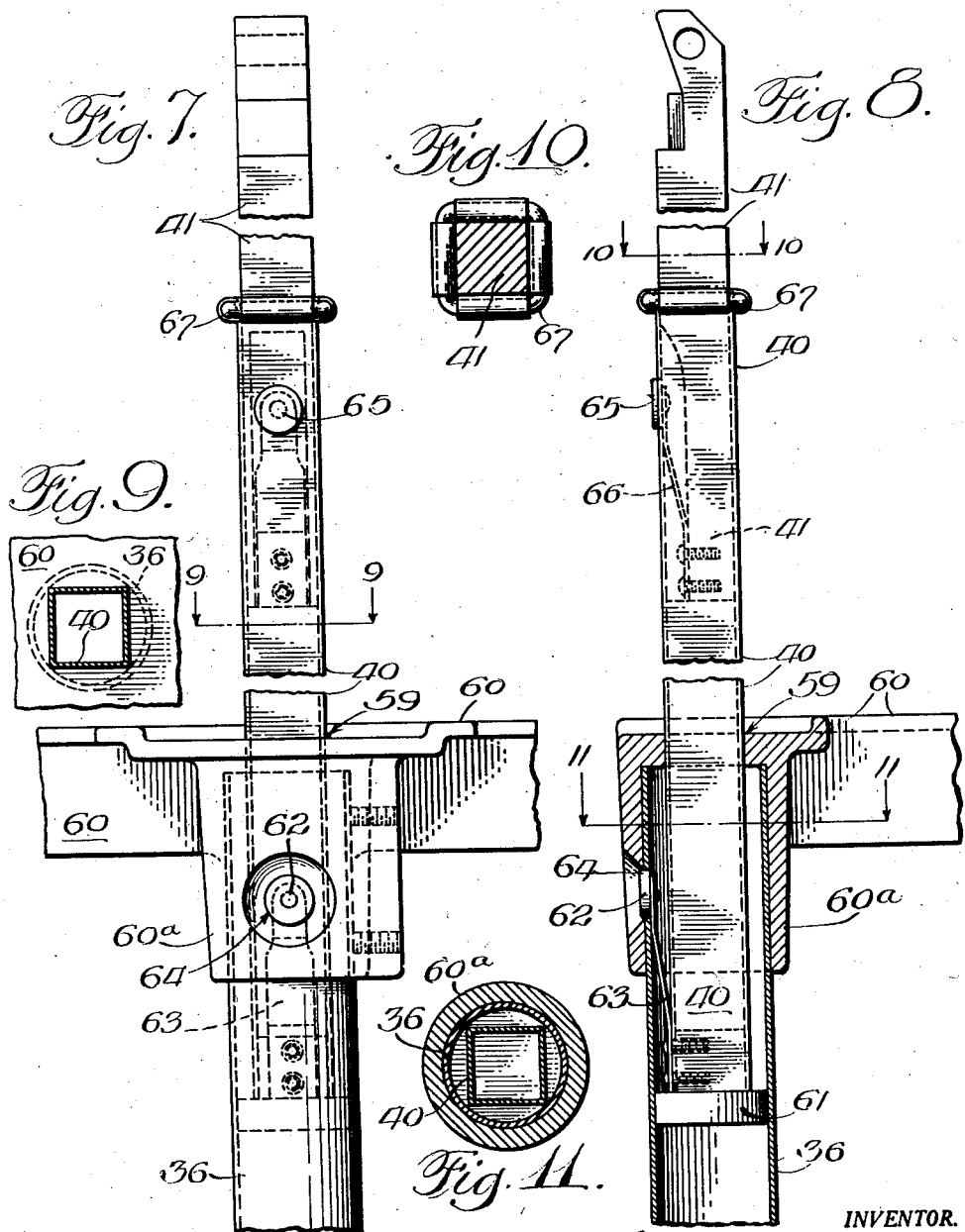

June 5, 1934.   G. H. TROUT   1,961,803
CABINET
Filed Oct. 10, 1931   5 Sheets-Sheet 5
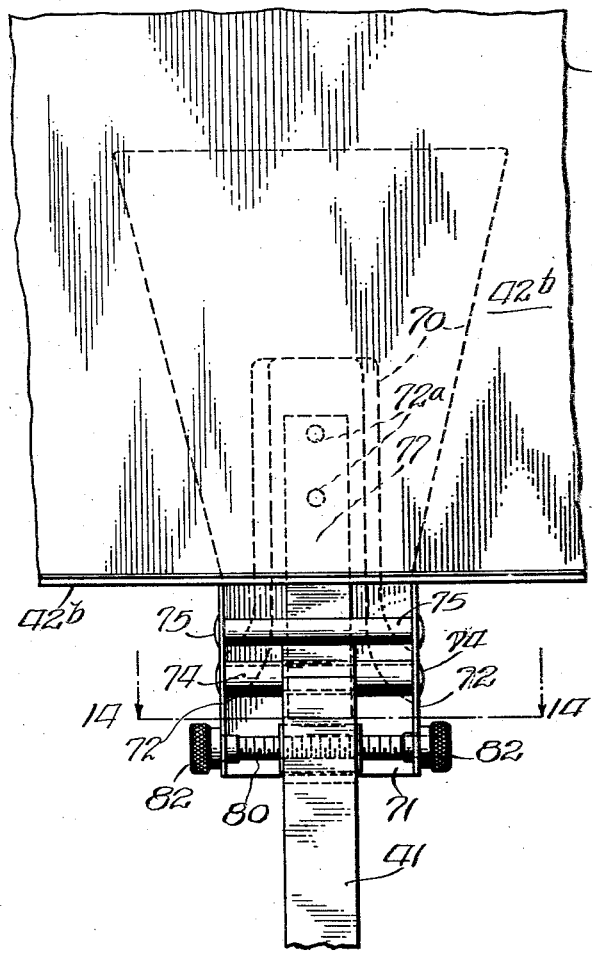
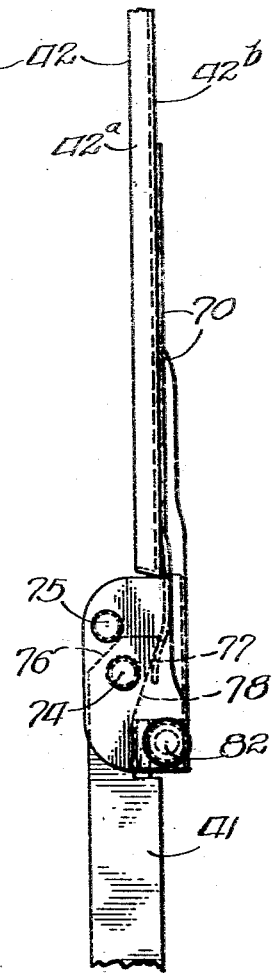
INVENTOR.
George H. Trout
BY Luther Johns
ATTORNEYS.

Patented June 5, 1934

1,961,803

UNITED STATES PATENT OFFICE 1,961,803

CABINET

George H. Trout, Chicago, Ill., assignor, by mesne assignments, to International Projector Corporation, New York, N. Y., a corporation of Delaware Application October 10, 1931, Serial No. 568,037

11 Claims. (Cl. 88—24)

These improvements relate primarily to cabinets. In the adaptation shown they relate to cabinets containing motion picture and sound reproducing devices.

One object is to provide a seat mechanism which may be withdrawn from the cabinet for use. In that connection objects are to provide a simple and easily operable seat mechanism occupying but little space when in the cabinet. The prime object of the invention in its more inclusive aspects is to provide a cabinet adapted to contain the various instruments or parts of a complete motion picture apparatus synchronized with sound whereby in such places as the home talking pictures may be had at a moderate cost and readily to be made available. Other objects and advantages will appear hereinafter.

In the drawings Figure 1 is a perspective of my improved cabinet complete with relatively movable parts shown in their operative positions respectively;

Fig. 2 is a perspective of the lower portion of the cabinet with a pair of doors swung open;

Fig. 3 is a similar but enlarged view showing the seat mechanism partially withdrawn;

Figs. 4, 5 and 6 are fragmentary views showing joint connections of the seat mechanism;

Figs. 7 and 8 are fragmentary side elevations, Fig. 8 being partly in section, showing the extensible or telescopic support for the mirror issuing from the seat mechanism;

Fig. 9 is a horizontal section on the line 9—9 of Fig. 7;

Figure 1:
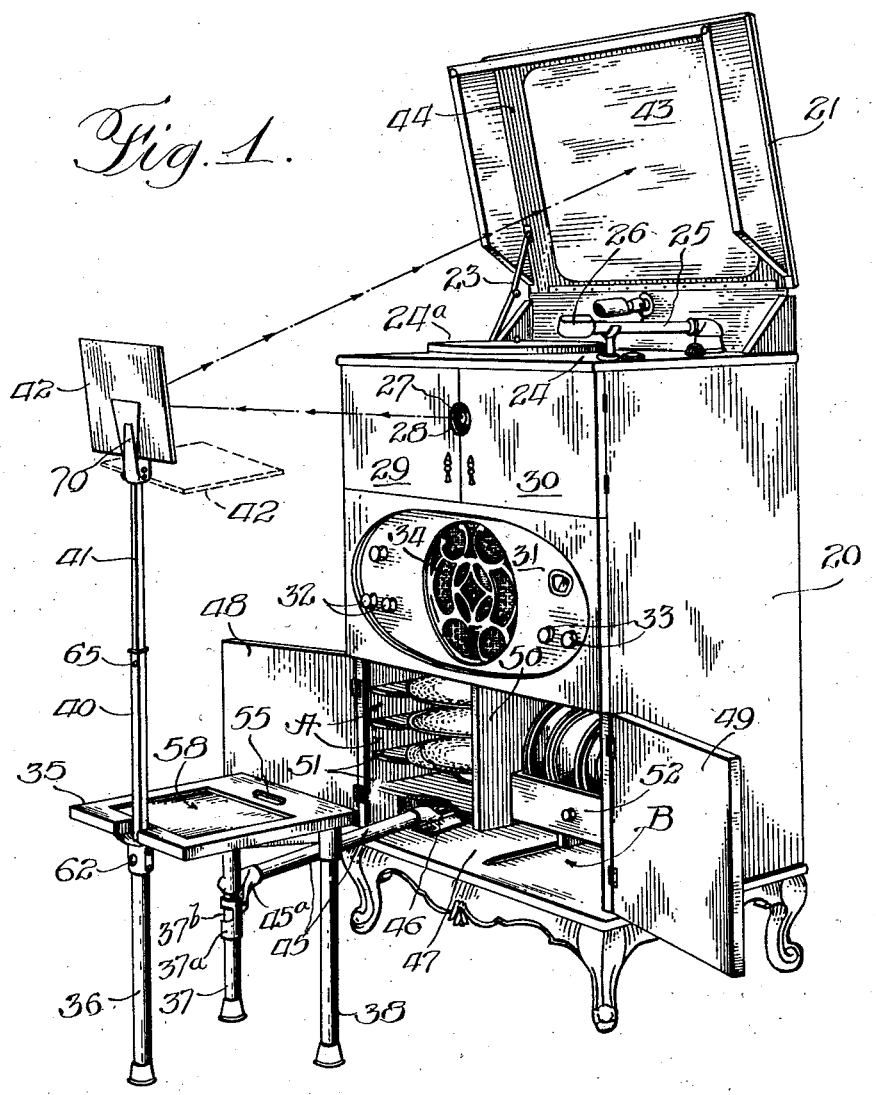

Figs. 10 and 11 are horizontal sections on the lines 10—10 and 11—11 respectively of Fig. 8;

Figs. 12 and 13 are fragmentary elevations turned at right angles to each other showing the mirror and its connections to the telescopic support;

Fig. 14 is a horizontal section on the line 14—14 of Fig. 12; and Fig. 15 is a vertical section on the line 15—15 of Fig. 14.

Turning to Fig. 1 the cabinet illustrated comprises a rectangular body 20, supported on legs and having a hinged and upwardly-swinging top or cover 21 releasably held in the position shown by the toggle support 23. The upper part of the cabinet carries an exposed turntable 24 for a disc phonograph record 24a, and there is a tone arm 25 having a pickup 26 adapted to cooperate with such record.

The cabinet body 20 is to be understood as having therein, in addition to means for operating the turntable, motion picture apparatus disposed in the upper portion thereof, the projection lens barrel 27 of which is seen through an opening 28 at the meeting edges of two doors 29 and 30 which are to be understood as mounted on hinges to swing apart thereby exposing such parts of the motion picture mechanism as the film reels and the gate mechanism. The motion picture machine elements immediately back of the doors 29 and 30 are illustrated in my copending application Serial No. 571,968, filed Oct. 30, 1931, entitled Motion picture machines.

It is to be understood also that within the cabinet 20 there is an electrical sound amplifying apparatus and arranged back of the panel marked 31. The several controls marked 32 and 33, are to be understood as parts of such amplifier.

According to the machine illustrated a motion picture is projected through the lens system 27 while sound synchronized with the picture issues from the phonograph apparatus, sound-modulated current from the electrical pickup 26 being amplified and the sound issuing from a loud speaker back of the grille work 34.

Fig. 1 shows a seat 35 supported by three legs 36, 37 and 38. Issuing upward from the seat mechanism is a supporting member 40 which moves downward into hollow leg 36, and a supporting member 41 which telescopes into member 40. At the top of member 41 is a mirror 42 so positioned that light beams issuing from lens system 27 are directed upon mirror 42 and are thence reflected back to a screen 43, which is substantially large and covers most of the area of the top wall 44 of cover 21. Screen 43 may be of any appropriate kind or character for picture projection. It may be considered to be a piece of flat board material or of metal with a reflecting coating of any well known or approved composition. Aluminum paint would serve.

Fig. 1 also shows that the seat mechanism is at the end of a rod 45 which has a mounting 46 within the hollow interior of the lower part of the cabinet, this mounting or connection 46 being secured to the floor 47 of the cabinet. There are two doors 48 and 49 mounted on hinges to swing open as shown exposing the interior.

The lower part of the cabinet is divided into two main chambers or compartments by partition 50. Compartment A has shelves 51 on which phonograph records may be placed. Compartment B has a sliding drawer 52 divided by partitions 53 (Fig. 3) adapted to hold film reel containers 54. This drawer 52 may be pulled out for access to the reel containers. It is spaced from the bottom 47 whereby legs 37 and 38 (Fig. 3) may pass beneath it, and leg 36 passes over drawer 52 and over such of the containers 54 as may be in the drawer.

Fig. 3 shows the seat mechanism housed within the body 20.

The seat 35 occupies the front of chamber B substantially as a closure therefor. Arm 45 is pivoted to swing on the connection 46 in horizontal planes. The operator takes hold of the seat 35 by grasping it through the hole 35 and swings the entire seat mechanism outward horizontally as shown in Fig. 3, but continuing the movement until the legs are entirely clear of the cabinet. He may continue the movement until arm 45 extends at right angles from the cabinet as shown in Fig. 1. The seat-and-legs unit may then be turned on the axis of rod 45 by means of a connection 45a (Fig. 5) having a slot 45b accommodating the head of a screw 45c threaded into rod 45. Connection 45a is mounted upon a connection 37a (Fig. 5) on leg 37, by means of a bolt 56. Connection 37a has a slot 37b and a screw therein threaded into leg 37 enabling connection 37a to turn on leg 37. The bolt 56 provides that connection 37a may swing relative to connection 45a whereby certain irregularities in the floor may be compensated for automatically without imposing strains on the cabinet through the swinging arm 45. The slot 37b is fairly wide in the directions of leg 37 to provide a vertical play taking care of differences in floor levels between that of the cabinet and that of the seat, as where either the cabinet or the seat is on a rug while the other is on the bare floor.

Assuming that the seat mechanism has been withdrawn and the seat proper swung around so that its legs come upon the floor, it would not be in the position shown in Fig. 1, but, as shown in Fig. 3, leg 38 would be against arm 45. The connection 37a permits the seat proper with its legs to be swung around on the axis of leg 37 while the feet are on the floor until the legs 38 and 36 come into their positions shown in Fig. 1. While I have thus shown steps by which the seat mechanism can be withdrawn and brought into the position of Fig. 1, as a matter of more simple practice the seat is first swung outward, then swung around on the axis of leg 37, and then turned on the axis of arm 45 until the feet touch the floor. The reverse of these movements would put the seat mechanism back into the cabinet.

Fig. 1 shows a rectangular depression 58 in seat 35. The mirror 42 fits into that depression when turned horizontally or into its dotted-line position in Fig. 1, rod 40 being then telescoped into leg 36 and rod 42 telescoped into rod 40. One may use the seat in the position shown in Fig. 1, with the mirror in its out-of-the-way position, when he desires to use merely the radio part of the device, and which has been referred to as the amplifier, or for threading the film, consulting records within the compartment, selecting film containers, etc. In many uses the reflecting mirror feature could be omitted. I have here a cabinet with a seat which folds thereinto and is withdrawable therefrom into operative position for use in front of the cabinet.

Figs. 7 and 8 show the telescopic features of the mirror support. Rod 40 is a hollow body which is of rectangular tubing largely so that it will not turn. It is shown square, and this square rod passes through a square opening at 59 in the casting 60 secured at the bottom of the seat 35 and to which casting the several legs are secured as by fastening them within socket extensions marked 60a in Figs. 7 and 8.

At the bottom of telescopic rod 40 is a circular piece 61 sliding upon the inner cylindrical surface of leg 36. A button 62 carried by spring 63 secured to rod 40 serves as a lock for holding rod 40 elevated. By pressing upon button 62 and forcing it out of the hole 64 bar 40 may be lowered into leg 36. Bar 41 is also a square member and telescopes into bar 40 and is held therein by a button 65 carried by spring 66 secured to bar 41. The metal of the sides of the square bar 40 is turned around a piece of wire 67 (Fig. 10) and forms a stop for limiting the downward movement of bar 40.

The connection of mirror 42 with the upper end of rod 41 is seen in Figs. 12 to 15 inclusive. The mirror illustrated may be considered to be a piece of glass 42a silvered on its inner surface with a metallic plate or backing 42b to which is secured a bracket 70 which extends beyond the lower edge of the mirror in the form of a U-shaped member of sheet metal having a base 71 and a pair of side flanges 72. This U-shaped member is mounted loosely on a pin 74 riveted in the flanges 72. The mirror may swing to the left and downward on pin 74 as viewed in Fig. 13, both the upward and downward movement being limited by pin 75 alternately coming in contact with the upper and lower parts of slanting surface 76 formed at the upper end of support 41.

A leaf spring 77 (Fig. 13) carried by rivets 77a (Fig. 12) presses against the slanting surface 78 (Fig. 13) near the upper end of support 41 and holds the mirror readily releasable in its vertical position. It may be swung downward against the tension of this spring 77.

Owing to irregularities in the floor surface—for example the seat may come upon a rug while the cabinet is standing on the bare floor—it is desirable to have the mirror adjustable in order to throw the reflected image properly upon the screen. By moving the seat as a whole on connection 46 the picture may readily be located between the sides of the screen, but it is likely to be too high or too low. I therefore provide means for tilting the mirror on a horizontal axis in order to vary the image in up and down directions on the screen. To this end I provide a screw shaft 80 (Fig. 12) threaded through a nut element 81 (Fig. 14), there being a finger wheel 82 at each end of the screw shaft, the nut element 81 having a slanting surface 83 coacting with a similar slanting surface 84 on the upper end portion of the support 41. By turning the screw shaft in one direction or the other the nut element 81 is moved so as to turn the U-shaped frame 71—72, and with it the mirror, on the axis of fixed shaft 74. Nut element 81 is an adjustable stop limiting the movement of the mirror in one direction under the action of spring 77 or causing it to incline as desired under the resistance of that spring.

By the means illustrated I have provided a device exceptionally advantageous from the standpoint of compactness, and in the provision of a cabinet of little more than ordinary phonograph cabinet size and containing all of the essentials of a motion picture projector synchronized with sound whereby talking pictures may be had at many places including the home where the larger type of equipment is unsuitable or of too great expense.

I contemplate as being included in these improvements all such changes, variations and departures from what is thus specifically illustrated and described as fall within the scope of the appended claims.

I claim:

1. In combination, walls forming a cabinet having a chamber adapted to accommodate a seat mechanism, a seat mechanism having legs and a seat proper positioned in said chamber, with means holding said seat mechanism for movement out of said chamber and into operative position for use as a seat adjacent to the cabinet, a mirror carried by the seat mechanism, means for holding the mirror in position to reflect in a given direction relative to the cabinet, and picture-projecting mechanism carried by the cabinet and having its optical axis directed upon the reflecting surface of said mirror.

2. The combination of claim 1 hereof in which the holding means for the seat mechanism include a swinging arm to which the seat mechanism is secured.

3. The combination of claim 1 hereof in which the holding means for the seat mechanism include a swinging arm to which the seat mechanism is secured, said seat mechanism being mounted to turn on said arm to vary the direction of the legs of the seat mechanism from substantially horizontal to substantially vertical, and vice versa.

4. The combination of claim 1 hereof in which the means for holding the mirror include means for adjustably varying the axis of reflection therefrom when the seat mechanism is holding the mirror in its operative position.

5. The combination of claim 1 hereof in which said mirror has a non-operative position substantially parallel with the seat proper, and there are means for holding the mirror for movement into its operative position.

6. The combination of claim 1 hereof in which said mirror has a non-operative position substantially parallel with the seat proper, and there are means for holding the mirror for movement into its operative position, said last-mentioned means including a telescopic support.

7. The combination of claim 1 hereof in which said mirror has a non-operative position substantially parallel with the seat proper, and there are means for holding the mirror for movement into its operative position, said last-mentioned means including a telescopic support, and there are means for holding the mirror on said telescopic support for angular adjustments to vary the direction of the optical axis of the projection from the mirror.

8. The combination of claim 1 hereof in which there are means carried by the cabinet and providing a picture-reflecting surface in the optical axis of the reflection from said mirror.

9. The combination of claim 1 hereof in which there are means carried by the cabinet and providing a picture-reflecting surface in the optical axis of the reflection from said mirror, said last-mentioned means being carried by a member mounted for swinging movements on the cabinet.

10. The combination of claim 1 hereof in which the cabinet has a top cover and said cover has a picture-reflecting surface on the inner side thereof, said cover being movable into a position in which said surface is in the axis of reflection from said mirror when the mirror is in its operative position.

11. The combination of claim 1 hereof in which there is a sliding drawer in said chamber and between legs of said seat mechanism when the latter is normally in said chamber.

GEORGE H. TROUT.